United States Patent
Maruyama et al.

(10) Patent No.: US 7,484,816 B2
(45) Date of Patent: Feb. 3, 2009

(54) VEHICLE CONTROL APPARATUS

(75) Inventors: Takahumi Maruyama, Saitama (JP); Toshitaka Imai, Saitama (JP); Seiji Ohsaki, Saitama (JP); Hiroyasu Ishizuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 484 days.

(21) Appl. No.: 11/286,692

(22) Filed: Nov. 23, 2005

(65) Prior Publication Data

US 2007/0114841 A1 May 24, 2007

(51) Int. Cl.
*B60T 8/32* (2006.01)
(52) U.S. Cl. .......................... 303/191; 303/20
(58) Field of Classification Search ............ 303/191, 303/192, 20, 89; 180/65.2, 65.3, 65.4; 701/22, 701/78; 477/71, 74, 170, 171, 172
See application file for complete search history.

(56) References Cited

U.S. PATENT DOCUMENTS

| | | | |
|---|---|---|---|
| 6,336,689 B1 * | 1/2002 | Eguchi et al. ............ 303/191 |
| 6,370,466 B1 * | 4/2002 | Hada et al. ................. 303/89 |
| 6,415,897 B1 * | 7/2002 | Sugimoto et al. ......... 303/119.1 |
| 6,439,675 B1 | 8/2002 | Zechmann et al. |
| 6,494,808 B2 * | 12/2002 | Lee ............................. 477/94 |
| 6,547,344 B2 * | 4/2003 | Hada et al. ................ 303/191 |
| 7,041,030 B2 * | 5/2006 | Kuroda et al. ............. 477/171 |
| 7,125,085 B2 * | 10/2006 | Ohsaki et al. ............. 303/119.1 |
| 2004/0140711 A1 * | 7/2004 | Romeo ....................... 303/20 |
| 2006/0061211 A1 * | 3/2006 | Ohsaki et al. ............. 303/113.4 |
| 2006/0108868 A1 * | 5/2006 | Ohsaki et al. ............. 303/154 |
| 2007/0096557 A1 * | 5/2007 | Tamai et al. ............... 303/191 |

* cited by examiner

*Primary Examiner*—Thomas J Williams
(74) *Attorney, Agent, or Firm*—Carrier, Blackman & Associates, P.C.; Joseph P. Carrier; William D. Blackman

(57) ABSTRACT

A vehicle control apparatus for controlling a prime mover and wheel brakes which are equipped in a vehicle with an automatic transmission. The vehicle control apparatus includes a prime mover stopping unit which stops and restarts the prime mover under predetermined conditions, and a braking force retaining unit which retains braking force of each of the wheel brakes. Even if the automatic transmission is set in a neutral range, the braking force retaining unit is controlled to retain the braking force of the wheel brakes for a first predetermined time after the operation of a brake operation member is disengaged.

20 Claims, 9 Drawing Sheets

TIMING CHART (1)

FIG.3
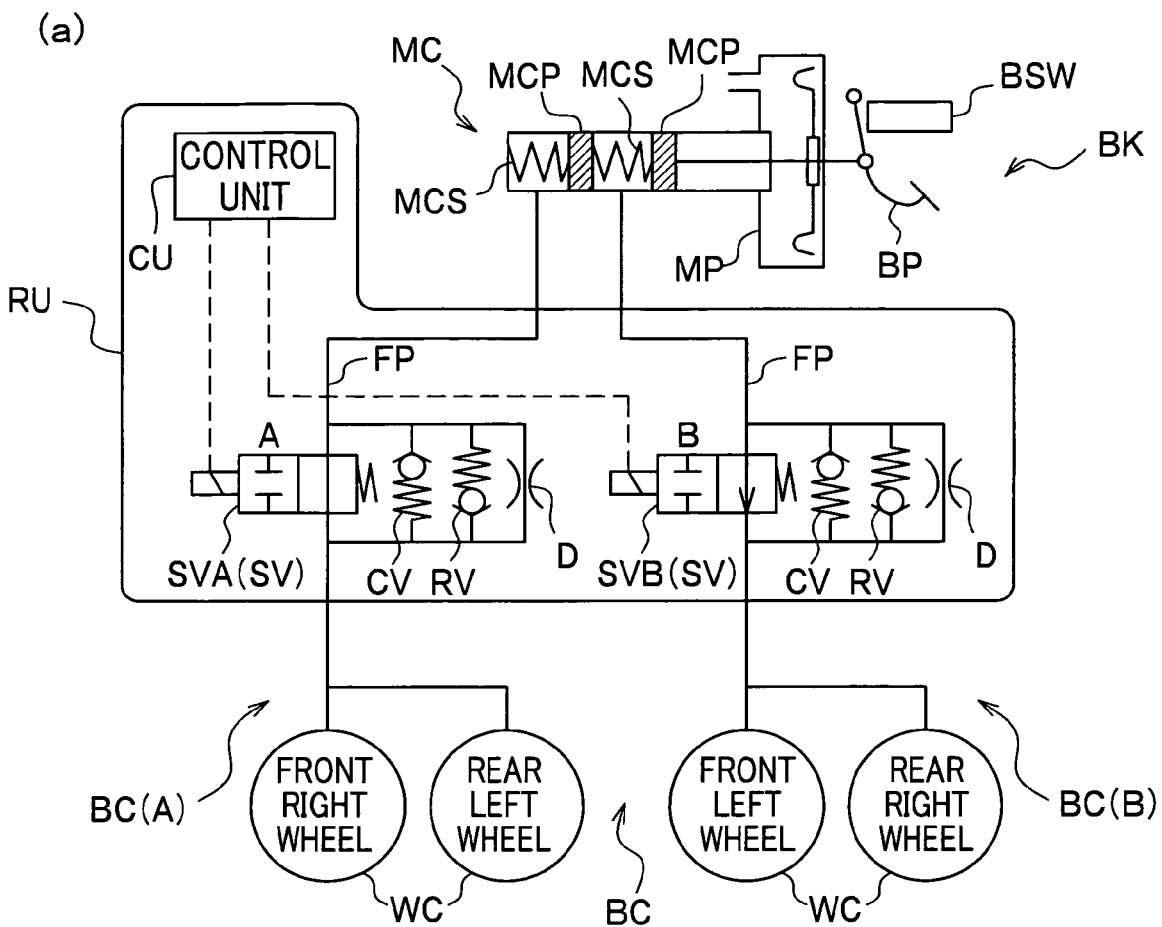
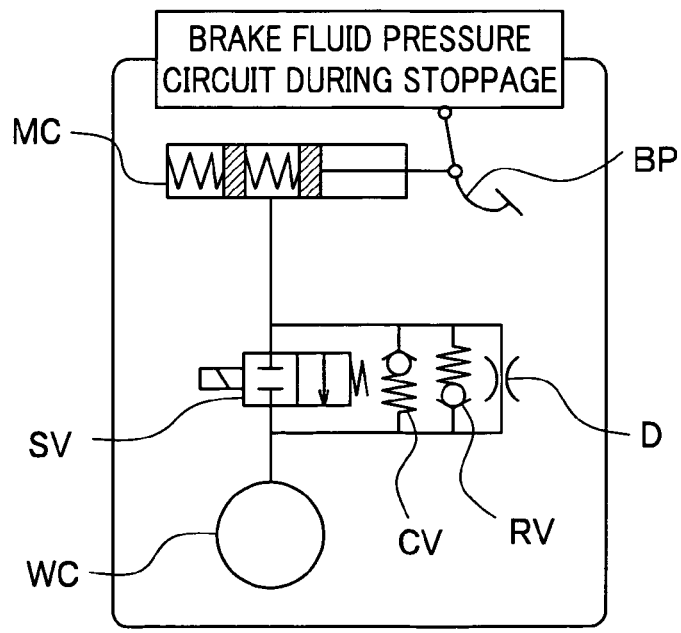

FIG.4
(a)
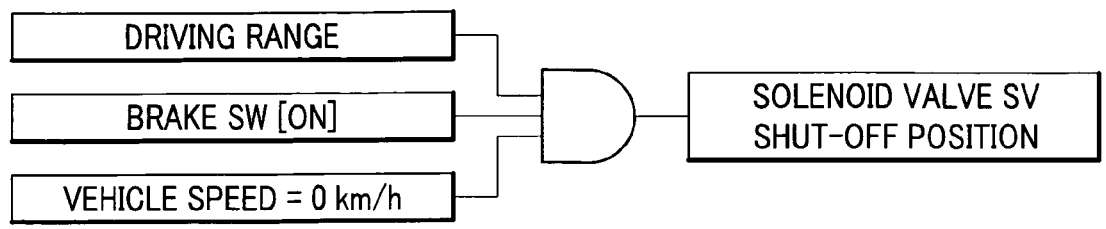
(b)
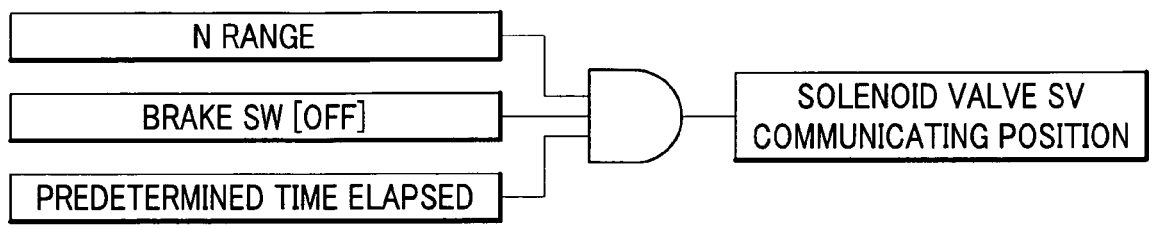

FIG. 5
(a)
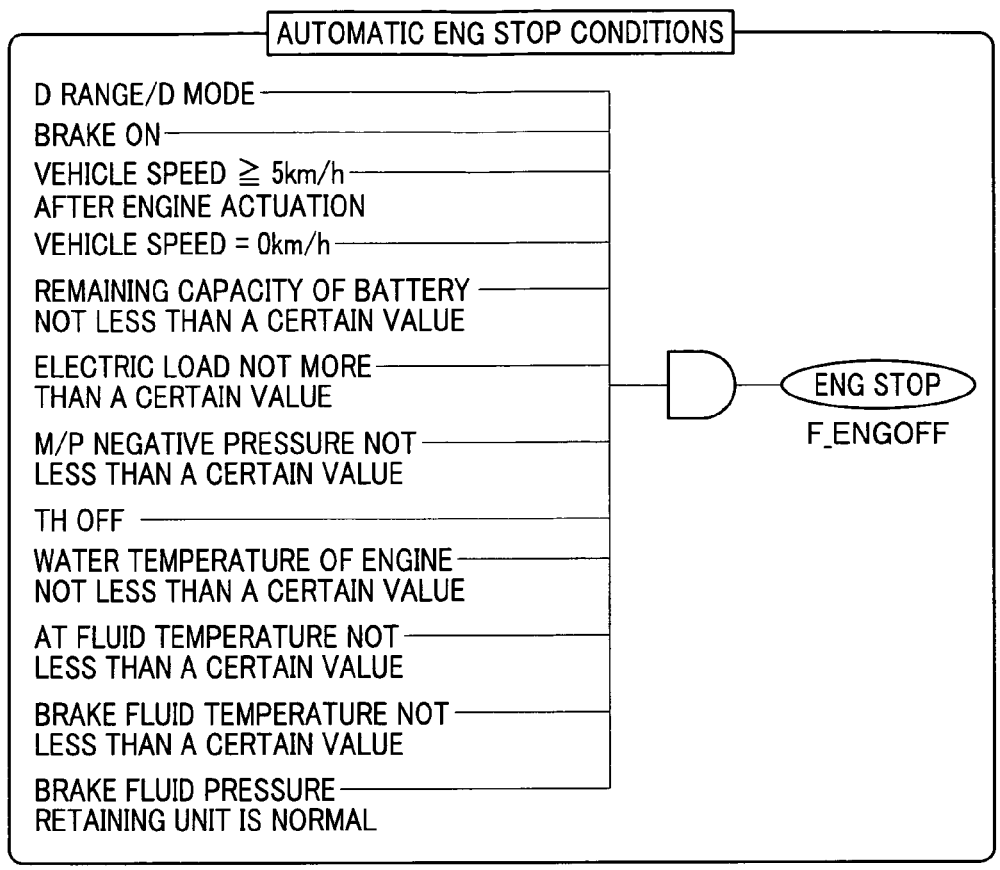
(b)
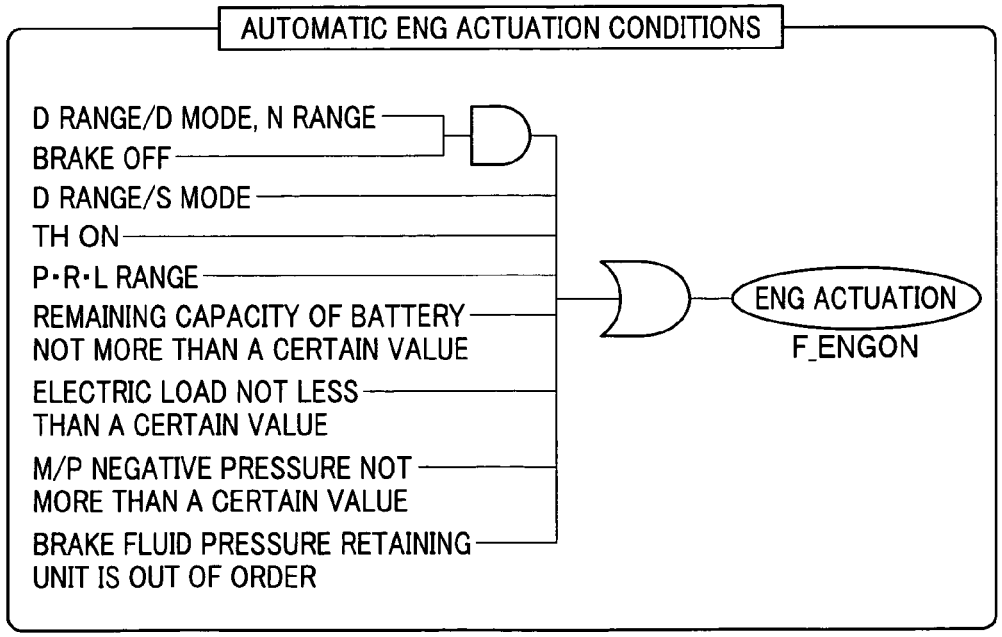

TIMING CHART (1)

TIMING CHART (2)

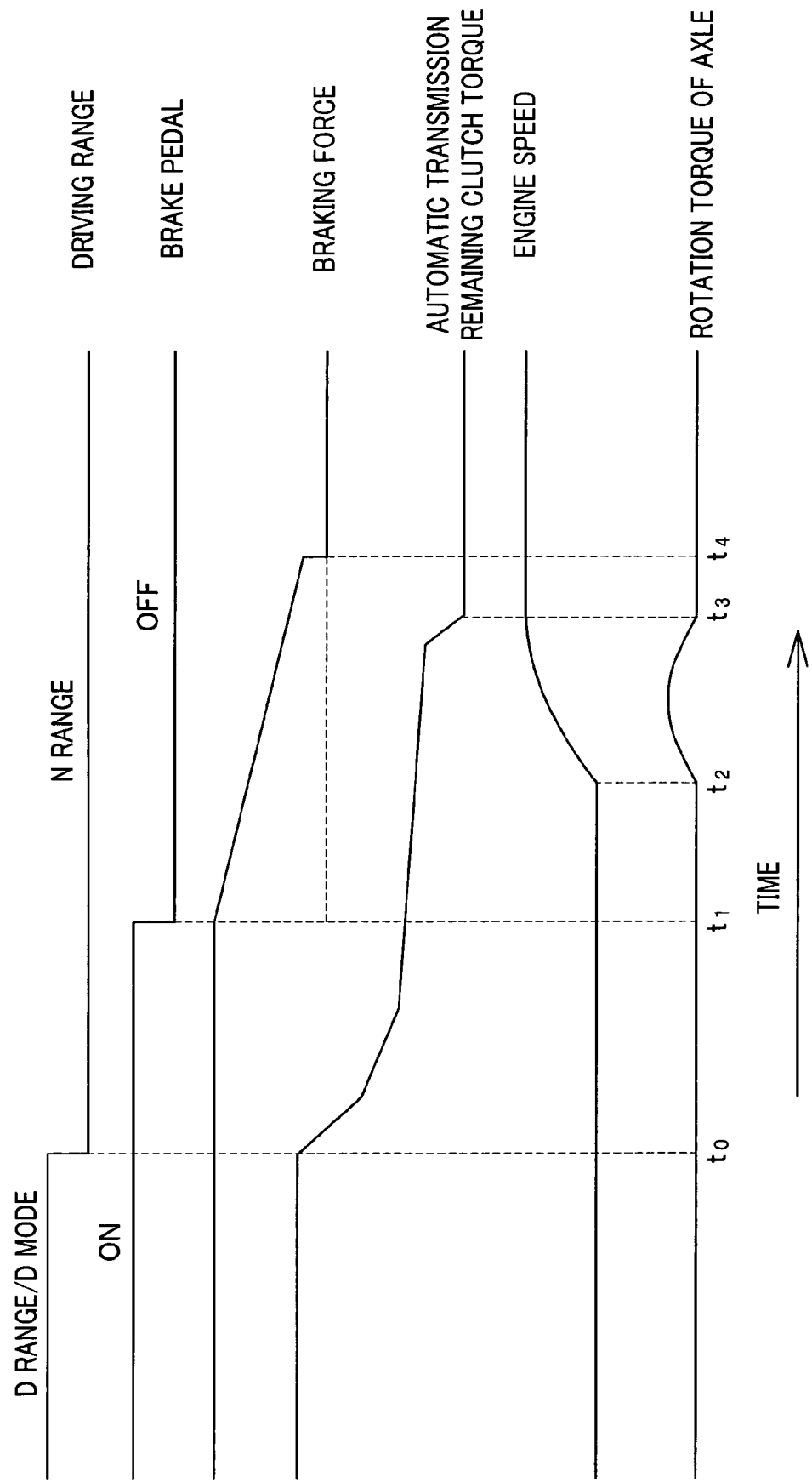

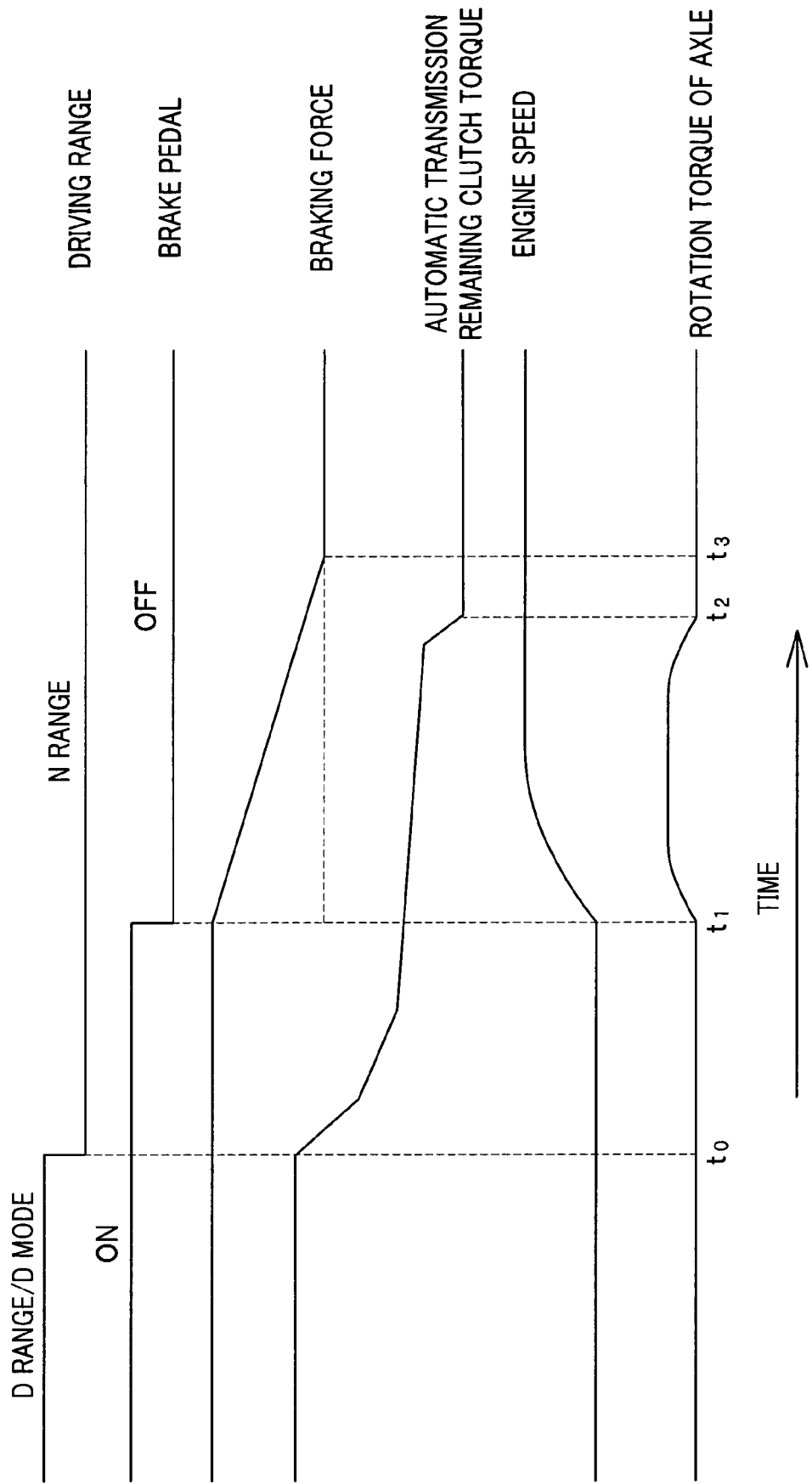

VEHICLE CONTROL APPARATUS

BACKGROUND OF THE INVENTION

The present invention relates to a vehicle control apparatus, and more particularly to a vehicle control apparatus for controlling a prime mover such as an engine and wheel brakes which are equipped in a vehicle with an automatic transmission.

A braking force retaining apparatus is known, which is equipped with a solenoid valve in a brake fluid pressure passage. The brake fluid passage extends between a master cylinder and a wheel cylinder. The solenoid valve can shut off the brake fluid pressure passage to retain the brake fluid pressure within the wheel cylinder after the depression of the brake pedal is released. This kind of braking force retaining apparatus provides a hill holder function to facilitate a starting operation on an uphill slope because the brake fluid pressure is retained after the release of the brake pedal. To realize the hill holder function, the brake fluid pressure is retained or released in accordance with various conditions.

U.S. Pat. No. 6,439,675 discloses a braking force retaining apparatus for decreasing the braking force that is retained without consideration of the brake pedal operation amount, wherein the retained braking force is decreased by an operation of the accelerator pedal, an engagement state of the clutch, etc. As one of the conditions where the braking force retaining apparatus decreases the braking force, it is recited that the transmission is set in the neutral (N) range.

The braking force retaining apparatus does not usually perform to retain brake fluid pressure in the neutral range. This is because the neutral range is a range where the driver has no intention of driving the vehicle with the engine driving force and where the vehicle is allowed to move by an external force or inertia, for example, in the case of traction. Therefore, it is considered that there is no need to retain brake fluid pressure when the driver selects the neutral range.

Meanwhile, a prime mover stopping apparatus is proposed, which stops the prime mover while the vehicle stops, to improve the fuel economy.

The prime mover stopping apparatus automatically stops the idling of the engine while the vehicle stops and restarts the engine when the driver depresses the clutch pedal or when the driver releases the brake pedal at a start up of the vehicle.

In cases where a vehicle with a fluid-type automatic transmission includes a braking force retaining apparatus and a prime mover stopping apparatus, the prime mover stopping apparatus automatically stops the engine when the vehicle that has been running stops in accordance with the depression of the brake pedal. Thereafter, as shown in FIG. 1, when the driver switches the selector of the automatic transmission to the neutral range and then releases the brake pedal, the retained braking force is released all at once. The prime mover stopping apparatus restarts the engine at the same time as the driver releases the depression of the brake pedal.

The fluid-type automatic transmission does not transmit the engine drive power to the driving wheels in the neutral range. However, a remaining clutch torque may exist in accordance with the oil pressure releasing time characteristics of the fluid clutch and/or the viscosity of the automatic fluid. Particularly, at a low temperature at which the automatic fluid provides a high viscosity, the transmissibility tends to be higher even if the transmission is set in the neutral range.

In this instance, if the engine restarts while the vehicle stops on a flat road with the automatic transmission set in the neutral range, a rotation torque of the axle may arise due to the engine torque that occurs at the restart of the engine and the remaining clutch torque of the automatic transmission, thereby resulting in dragging of the vehicle.

It is an object of the present invention to overcome the foregoing drawback.

SUMMARY OF THE INVENTION

It is an aspect of the present invention to provide a vehicle control apparatus for controlling a prime mover and wheel brakes which are equipped in a vehicle with an automatic transmission. The vehicle control apparatus includes a prime mover stopping unit which stops and restarts the prime mover under predetermined conditions, and a braking force retaining unit which retains braking force of each of the wheel brakes. Even if the automatic transmission is set in a neutral range, the braking force retaining unit is controlled to retain the braking force of the wheel brakes for a first predetermined time after an operation of a brake operation member is disengaged.

The first predetermined time may at least include a period of time from when the operation of the brake operation member is disengaged to when a remaining clutch torque of the automatic transmission that has been set in the neutral range is lost.

The braking force retaining unit may retain the braking force such that the braking force gradually decreases after the operation of the brake operation member is disengaged.

Further, the braking force retaining unit may release the braking force after a second predetermined time elapses from when the operation of the brake operation member is disengaged.

The second predetermined time may be a period of time from when the operation of the brake operation member is disengaged to when the prime mover stopping unit restarts the prime mover.

The prime mover stopping unit may stop the prime mover when the vehicle that has been running stops in accordance with the operation of the brake operation member, and restart the prime mover when the operation of the brake operation member is disengaged.

Further, the prime mover stopping unit may restart the prime mover after a third predetermined time elapses from when the operation of the brake operation member is disengaged.

The third predetermined time is set to be shorter than the first predetermined time.

Further, the braking force retaining unit may release the braking force after a fourth predetermined time elapses from when a selector of the automatic transmission is shifted from a driving range to a neutral range.

The fourth predetermined time is set to be in the range between 0.5 to 1 second.

Other objects and advantages of the present invention will become apparent from the detailed description to follow taken in conjunction with the appended claims.

BRIEF DESCRIPTION OF THE DRAWINGS

Preferred embodiments of the present invention will be described below, by way of example only, with reference to the accompanying drawings, in which:

FIG. 3 is an explanatory view of a brake fluid pressure retaining unit as one embodiment of a braking force retaining unit, in which FIG. 3(a) shows the overall construction, and FIG. 3(b) schematically shows a brake fluid pressure circuit while the vehicle stops;

FIG. 4 shows the control logic of the brake fluid pressure retaining unit while the vehicle is stopped, in which FIG. 4(a) shows the logic for switching a solenoid valve to a shut-off position, and FIG. 4(b) shows the logic for switching the solenoid valve to a communicating position;

FIG. 5 explains operation of the prime mover stopping unit, in which FIG. 5(a) shows the logic for automatically stopping the engine, and FIG. 5(b) shows the logic for restarting the engine;

FIG. 8 is a timing chart (3) for a third configuration of a vehicle equipped with a vehicle control apparatus according to the present invention, wherein timing of retaining/releasing brake fluid pressure by the brake fluid pressure retaining unit and timing of restarting the engine by the prime mover stopping unit are shown;

FIG. 9 is a timing chart (4) for a fourth configuration of a vehicle equipped with a vehicle control apparatus according to the present invention, wherein timing of retaining/releasing brake fluid pressure by the brake fluid pressure retaining unit and timing of restarting the engine by the prime mover stopping unit are shown.

DETAILED DESCRIPTION OF THE INVENTION

Japanese Laid-open Patent Application No. 2000-255398 invented by Takahiro Eguchi et al. and assigned to Honda Motor Co., Ltd. that is also the assignee of the present application discloses a brake fluid pressure retaining unit having a hill holder function. The contents of Japanese Laid-open Patent Application No. 2000-255398 are hereby incorporated by reference.

A vehicle control apparatus according to the present invention includes a prime mover stopping unit which stops and restarts a prime mover under predetermined conditions, and a braking force retaining unit which retains braking force of wheel brakes. The vehicle control apparatus is adapted to a vehicle with an automatic transmission. The vehicle control apparatus controls the braking force retaining unit such that even if the automatic transmission is set in the neutral range, the braking force retaining unit retains the braking force for a predetermined time after the operation of a brake operation member is disengaged.

The prime mover includes an engine driven with gasoline, etc. and a motor driven with electricity. The vehicle indicates an automatic transmission vehicle (hereinafter referred to as an AT vehicle) which mounts an automatic transmission.

The wording "to retain the braking force" is not limited for the type of retaining fluid pressure, and also includes other types of retaining braking force by means of a brake-by-wire system, and other mechanical means.

Further, the brake operation member is not limited to a brake pedal BP to be described later, and also includes a bar handle type brake which can be operated by hand.

Figure 1:
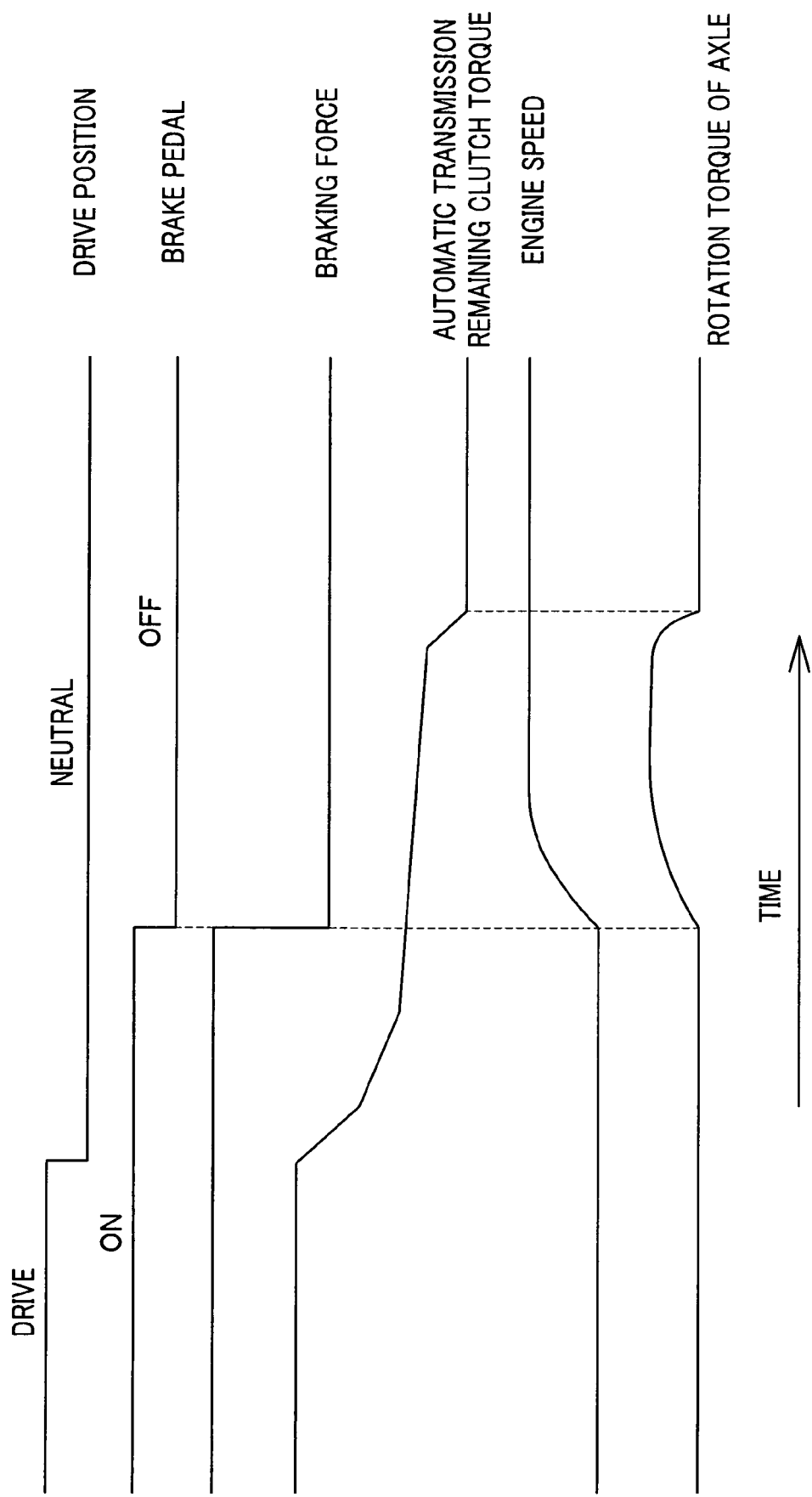
FIG. 1 is a timing chart of a conventional vehicle equipped with a braking force retaining unit and a prime mover stopping unit, wherein timing of retaining/releasing braking force by the braking force retaining unit and timing of restarting the engine by the prime mover stopping unit are shown.
Figure 2:
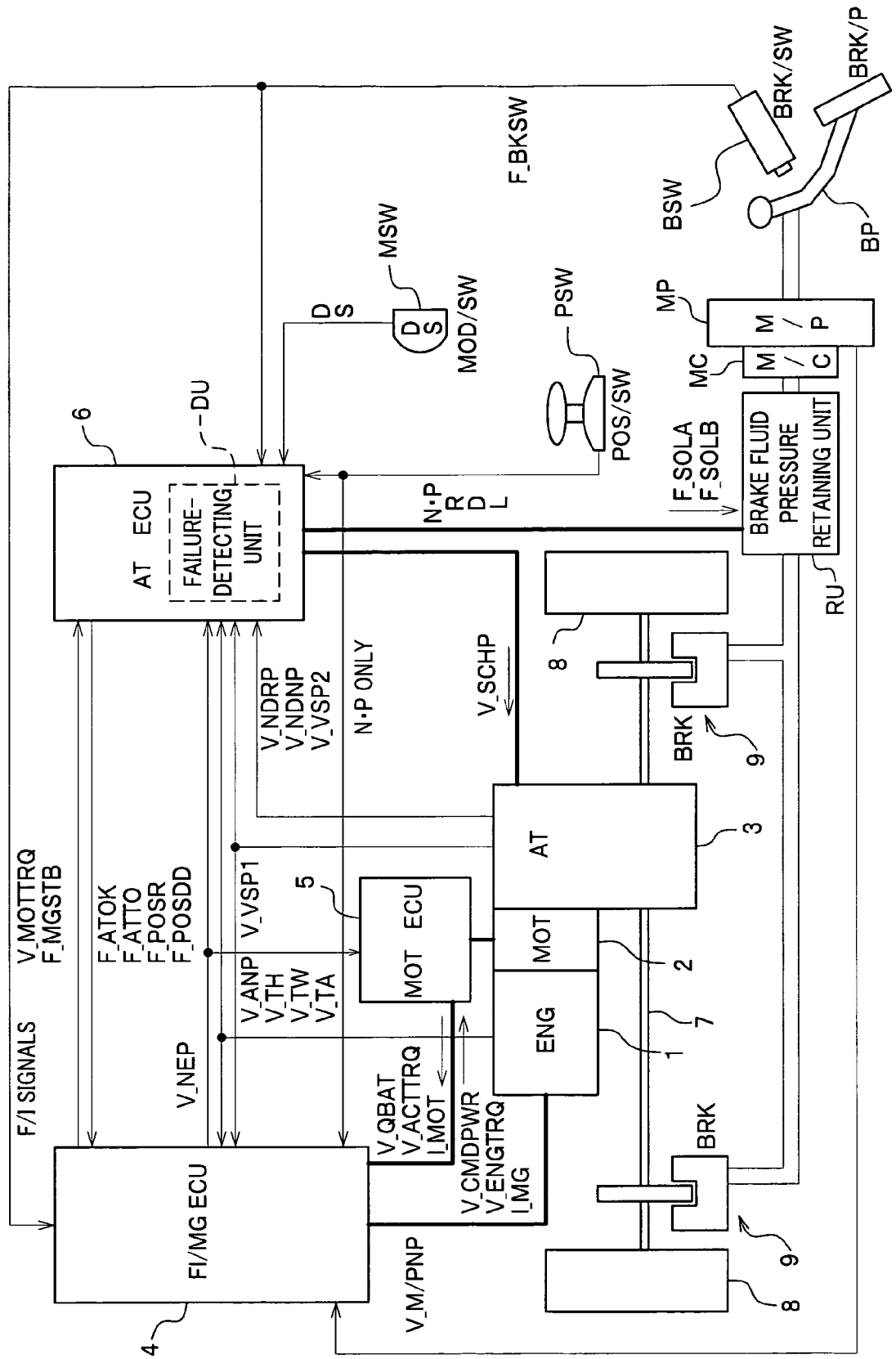
FIG. 2 shows a system configuration of a vehicle equipped with a vehicle control apparatus according to the present invention.

With reference to FIG. 2, description will be given to one embodiment of an AT vehicle (hereinafter referred to as a vehicle) which mounts a vehicle control apparatus according to the present invention.

The vehicle described in this embodiment is a hybrid type vehicle equipped with an engine and a motor as prime movers, and as an automatic transmission, the vehicle is provided with a fluid-type automatic transmission (hereinafter referred to as AT) using a torque converter.

The prime mover stopping unit automatically stops/restarts the engine while the vehicle stops. Construction of the prime mover stopping unit and various conditions for automatically stopping/restarting the engine will be described later.

Brake fluid pressure retaining unit RU as one embodiment of the braking force retaining unit is so constructed that a solenoid valve SV, a restriction D, a relief valve RV, and a check valve CV are provided in a brake fluid pressure circuit BC. Details of the brake fluid pressure retaining unit RU will be described later.

System Configuration

System configuration of the vehicle according to this embodiment will be described with reference to FIG. 2. The vehicle is equipped with an engine 1 and a motor 2 as prime movers, and as a transmission, the vehicle is provided with an AT 3 using a torque converter. The engine 1 is controlled at a fuel injection electronic control unit (hereinafter referred to as FI ECU). The FI ECU is integrally constructed with a management electronic control unit (hereinafter referred to as MG ECU), and it is incorporated in a fuel injection/management electronic control unit 4 (hereinafter referred to as FI/MG ECU). The motor 2 is controlled at a motor electronic control unit 5 (hereinafter referred to as MOT ECU). Further, AT 3 is controlled at an AT electronic control unit 6 (hereinafter referred to as AT ECU).

A drive axle 7 provided with two driving wheels 8, 8 is mounted to the AT 3. Each driving wheel 8 is provided with a disc brake 9, which includes a wheel cylinder WC and the like (FIG. 3). The wheel cylinders WC of the disc brakes 9 are connected to a master cylinder MC through a brake fluid pressure retaining unit RU. When the driver depresses the brake pedal BP, the brake pedal load generated is transmitted to the master cylinder MC through the master power MP. A brake switch BSW detects whether or not the brake pedal BP is depressed. It is also possible to detect a brake fluid pressure amount within the master cylinder MC, and based on the detected amount it can be determined whether or not the brake pedal BP is depressed.

Engine 1 is an internal combustion engine which makes use of thermal energy. Engine 1 drives the two driving wheels 8 through AT 3 and the drive axle 7. In order to improve fuel consumption, the engine 1 is automatically stopped while the vehicle stops. For this reason, the vehicle is provided with a prime mover stopping unit for automatically stopping the engine 1 when certain automatic engine stop conditions are satisfied.

Motor 2 assists the engine drive with the use of electric energy from a battery (not shown). The motor 2 has a plurality of control modes, such as: an assist mode for assisting the engine driving force; a regeneration mode for converting the kinetic energy derived from the rotation of the drive axle 7 into electric energy when the engine 1 does not require an assist from the assist mode (such as during the drive on a downhill slope or during deceleration of the vehicle), so that the converted electric energy is stored in the battery (not shown); and an actuation mode for actuating the engine 1.

AT 3 has a known construction in which three kinds of blades, such as of a pump impeller (hereinafter referred to as a pump), a turbine runner (hereinafter referred to as a turbine), and a stator, are accommodated in a donut-shaped casing. The pump is connected to a crank shaft of the engine 1, and the turbine is connected to the output shaft. The stator is sandwiched at the inner peripheral center between the pump and the turbine. Rotation of the pump that is generated by the rotation of the engine 1 is transmitted to the turbine through automatic fluid (oil), so as to rotate the turbine together with the oil that is returned from the turbine and recirculated by the stator. When the turbine rotates, the output of the engine 1, etc. can be transmitted to the drive axle 7 through output-side gears.

When a depression of the accelerator pedal is released (e.g., in an idling state) and a positioning switch PSW selects a driving range (D range, L range or R range), the AT vehicle moves slowly as if it creeps along the ground if the driver releases a depression of the brake pedal BP.

Range positions of the positioning switch PSW are selected by a shift lever. These range positions are selected from a P range for parking the vehicle, an N range as a neutral range, an R range for backward running, a D range for normal running, and an L range for obtaining a sudden acceleration or strong engine brake. The term "driving range" indicates a range position, at which the vehicle can move. In this vehicle, the running range includes the D range, L range and R range. The term "non-driving range" indicates the P range and N range. When the positioning switch PSW selects the D range, a D mode as a normal running mode and an S mode as a sports mode can be selected by a mode switch MSW.

The FI ECU contained in FI/MG ECU 4 controls the amount of fuel injection to achieve the optimum air fuel ratio, and it also generally controls engine 1. Various kinds of information such as a throttle angle and conditions of engine 1 are transmitted to the FI ECU such that engine 1 is controlled based on this information. The MG ECU contained in FI/MG ECU 4 mainly controls MOT ECU 5 as well as determining automatic engine stop conditions and automatic engine actuation conditions. The MG ECU receives information regarding the conditions of motor 2 and other information such as conditions of engine 1 from the FI ECU, and based on this information it sends instructions about the mode switching of motor 2 to MOT ECU 5. Further, the MG ECU receives information such as conditions of AT 3, conditions of engine 1, range information of the positioning switch PSW, conditions of motor 2 and the like, and based on this information it determines whether engine 1 should be automatically stopped or automatically actuated.

MOT ECU 5 controls motor 2 based on a control signal from FI/MG ECU 4. The control signal from FI/MG ECU 4 includes mode information instructing actuation of engine 1 by motor 2, assistance of the engine actuation or regeneration of electric energy, and an output required value to motor 2, and MOT ECU 5 sends an order to motor 2 based on this information. Further, MOT ECU 5 receives information from motor 2 and transmits information such as the amount of generated energy and the capacity of the battery to FI/MG ECU 4.

AT ECU 6 as a control unit CU controls the transmission gear ratio of AT 3, the hydraulic pressure of the starting clutch and the like. Various kinds of information such as the condition of AT 3, conditions of engine 1, range information of the positioning switch PSW and the like is transmitted to AT ECU 6, and based on this information AT ECU 6 transmits to AT 3 a signal for controlling the hydraulic pressure for engagement/disengagement of the starting clutch of AT 3. AT ECU 6 also controls ON/OFF of the solenoid valve SV (FIG. 3(a)) provided in the brake fluid pressure retaining unit RU. Further, AT ECU 6 includes a failure-detecting unit DU for detecting a malfunction of the brake fluid pressure retaining unit RU. The failure-detecting unit DU includes a driving circuit for switching ON/OFF the solenoid valve SV of the brake fluid pressure retaining unit RU.

Disk brakes 9, 9 are constructed such that a disk rotor rotatable with driving wheel 8 is pressed between the brake pads moved by the wheel cylinder WC (FIG. 3(a)) and braking force is obtained by the frictional force therebetween. Brake fluid pressure within the master cylinder MC is transmitted to the wheel cylinder WC through the brake fluid pressure retaining unit RU.

As described later, brake fluid pressure retaining unit RU continuously acts brake fluid pressure on the wheel cylinder WC after the depression of the brake pedal BP is released. The brake fluid pressure retaining unit RU also includes a driving circuit for driving (ON/OFF) the solenoid valves SVA, SVB (FIG. 3(a)) of the brake fluid pressure retaining unit RU in the failure-detecting unit DU provided in AT ECU 6.

The ON/OFF operation of the solenoid valve will be described. In the normally open type solenoid valve, when the solenoid valve is ON, the solenoid valve closes to a shut-off position such that a flow of brake fluid is shut off, and when the solenoid valve is OFF, the solenoid valve opens to a communicating position such that a flow of brake fluid is allowed. However, in the normally closed type solenoid valve, when the solenoid valve is ON, the solenoid valve opens to a communicating position such that a flow of brake fluid is allowed, and when the solenoid valve is OFF, the solenoid valve closes to a shut-off position such that a flow of brake fluid is shut off. Solenoid valves SVA, SVB in this embodiment are of the type that are normally open. The driving circuit starts or stops a supply of electric currents to respective coils of the solenoid valves SVA, SVB to turn ON and OFF the solenoid valves.

Prime mover stopping unit incorporated in the vehicle includes the FI/MG ECU 4 and other elements. The prime mover stopping unit enables an automatic engine stop operation while the vehicle stops. The prime mover stopping unit determines the automatic engine stop conditions, such as the vehicle speed of 0 km/h, at MG ECU of the FI/MG ECU 4. The automatic engine stop conditions will be described later. When all of the automatic engine stop conditions are satisfied, FI/MG ECU 4 sends an engine stop order to engine 1 to automatically stop engine 1. Because the prime mover stopping unit automatically stops engine 1, the vehicle's fuel consumption improves.

MG ECU of the FI/MG ECU 4 determines automatic engine actuation conditions while the prime mover stopping unit automatically stops engine 1. When all of the automatic engine actuation conditions are satisfied, FI/MG ECU 4 sends an engine actuation order to MOT ECU 5. MOT ECU 5 further transmits an engine actuation order to motor 2. Motor 2 then automatically actuates engine 1. The automatic engine actuation conditions will be described later. Also, when the failure-detecting unit DU detects a malfunction of the brake fluid pressure retaining unit RU, operation of the prime mover stopping unit is prohibited.

With reference to FIGS. 3 and 4, the brake fluid pressure retaining unit RU according to this embodiment will be described together with fluid operation-type braking device as wheel brakes.

Fluid Operation-Type Braking Device

Fluid operation-type braking device (hereinafter referred to as a braking device) BK will now be described with reference to FIG. 3(a). Brake fluid pressure circuit BC of the braking device BK includes a master cylinder MC, wheel cylinders WC, and a brake fluid passage FP connecting the master cylinder MC and the wheel cylinders WC. Because braking is a very important safety factor, the braking device BK has two separate systems of brake fluid pressure circuits BC(A), BC(B).

A master cylinder piston MCP is inserted into a main body of the master cylinder MC. When the driver applies a load to the brake pedal BP, the piston MCP is pressed and pressure is applied to the brake fluid within the master cylinder MC so that mechanical force is converted into brake fluid pressure, i.e., the pressure applied to the brake fluid. When the driver releases the brake pedal BP by removing the applied load, the piston MCP is returned to the original position by the resilient action of a return spring MCS and brake fluid pressure is released. In order to have a fail-safe mechanism, two separate brake fluid pressure circuits BC are provided. For this reason, the master cylinder MC shown in FIG. 3(a) is a tandem master cylinder, where two pistons MCP are connected in series so that the main body of the master cylinder MC is divided into two portions. The master cylinder MC is connected to a reservoir tank for brake fluid (not shown) so that the amount of brake fluid in the brake fluid pressure circuit BC can be adjusted.

A master power unit MP (brake booster) is provided between the brake pedal BP and the master cylinder MC to ease the braking effort of the driver. The master power unit MP shown in FIG. 3(a) is a vacuum servo type. The master power unit MP removes negative pressure from an intake manifold (not shown) of engine 1 (FIG. 2) to facilitate the braking operation of the driver.

The brake fluid passage FP connects the master cylinder MC and the wheel cylinders WC. The brake fluid passage FP functions as a fluid channel for brake fluid. Brake fluid pressure generated at the master cylinder MC is transmitted to the wheel cylinders WC because the flow of the brake fluid travels through the brake fluid passage FP. When the brake fluid pressure within the wheel cylinders WC is greater, the brake fluid is transmitted from the wheel cylinders WC to the master cylinder MC through the brake fluid passage FP. Because two separate brake fluid pressure circuits BC are provided for the reason mentioned above, two separate brake fluid passage systems FP are also provided.

The wheel cylinder WC is provided for each wheel so that brake fluid pressure generated at the master cylinder MC and transmitted to the wheel cylinders WC through the brake fluid passage FP is converted into a mechanical force (braking force) for braking wheels 8. A piston is inserted into the main body of the wheel cylinder WC so that when the piston is pressed by the brake fluid pressure, it generates a braking force for actuating brake pads in disc brakes or brake shoes in drum brakes.

Brake Fluid Pressure Retaining Unit

With reference to FIG. 3(a), the brake fluid pressure retaining unit RU will be described. The brake fluid pressure retaining unit RU is incorporated in the brake fluid passage FP and includes a solenoid valve SV for shutting off a flow of brake fluid. To control the solenoid valve SV, a control unit CU is provided. The brake fluid pressure retaining unit RU also includes a restriction D, check valve CV and a relief valve RV in the brake fluid passage FP, if necessary.

The normally-open solenoid valve SV is actuated by an electric signal from the control unit CU. The solenoid valve SV shuts off a flow of brake fluid within the brake fluid passage FP in its shut-off position to retain the brake fluid pressure applied to the wheel cylinders WC. A flow of brake fluid within the brake fluid passage FP is communicated when the solenoid valve SV is in a communicating position.

When the vehicle that has been running (in a driving state) stops in accordance with the depression of the brake pedal BP, the solenoid valve SV is switched to the shut-off position and retains brake fluid pressure as illustrated in FIG. 3(b).

The solenoid valve SV prevents the vehicle from unintentionally rolling down a slope (unintentional backward displacement of the vehicle). This is because even if the driver releases the depression of the brake pedal BP while the prime mover stopping unit automatically stops engine 1, brake fluid pressure is retained within the wheel cylinder WC. The term "unintentionally rolling down a slope" or "unintentional backward displacement" means that the vehicle moves in an opposite direction due to its own weight, in other words, the vehicle begins to descend backwards on a slope.

The solenoid valve SV may be a servo valve having a function to adjust flow rate or pressure, and other known valves.

According to this embodiment, the solenoid valve SV continues to retain brake fluid pressure until a first predetermined time elapses. In the case where the transmission is set in a driving range, the first predetermined time is set as time required for changing the depression of the pedal from when the driver releases the depression of the brake pedal BP to when the driver depresses the accelerator pedal. In the case where the transmission is set in the neutral range, the first predetermined time is set as time for retaining sufficient braking force for preventing the vehicle from unintentionally rolling down the slope even if a rotation torque of the axle generates due to a remaining clutch torque of the automatic transmission and an engine torque generated upon restarting engine 1 that has been automatically stopped. In the timing charts (1) through (4) to be described later, the first predetermined time is set for 500 msec.

A restriction D is provided as necessary. The restriction D always connects the master cylinder MC and the wheel cylinders WC regardless of the conditions of the solenoid valve SV such as in the communicating position or the shut-off position. When the solenoid valve SV is in the shut-off position and the driver gradually or instantly releases the brake pedal BP, the restriction D reduces brake fluid pressure within the wheel cylinder WC at a certain speed by gradually transferring brake fluid from the wheel cylinder WC to the master cylinder MC. A restriction D maybe formed by a flow control valve provided in the brake fluid passage FP.

Forming the restriction D by a flow control valve allows the retained braking force to be gradually decreased or to be gradually decreased after a certain period of time (second predetermined time) elapses. As with the case of Timing chart (1) to be described later, it is possible to differentiate a decreasing rate of the braking force for a certain period of time and a decreasing rate of the braking force after the certain period of time elapses.

The brake fluid pressure retaining unit RU retains brake fluid pressure such that the brake fluid pressure gradually decreases through the restriction D until all the brake fluid retained within the wheel cylinder WC flows to the master cylinder MC. Retaining brake fluid pressure (braking force) is not limited to the retention of brake fluid pressure by the solenoid valve SV, and also includes retention during the releasing operation of brake fluid pressure through this restriction D.

When the restriction D is provided, if the driver gradually or instantly releases the brake pedal BP, the braking force is gradually lowered so that even if the solenoid valve SV is in the shut-off position, the brake does not work permanently. Therefore, even if the solenoid valve SV is in the shut-off position, the braking force is reduced after a certain period of time so that the vehicle can start to move on an uphill slope by the starting driving force. Meanwhile, the vehicle can start off on a downhill slope due to its own weight by merely releasing the brake pedal BP gradually or instantly without requiring the accelerator pedal operation of the driver.

For example, reduction speed of the brake fluid pressure within the wheel cylinder WC through the restriction D is determined to prevent the vehicle from unintentionally rolling down a slope during the time the driver releases the brake pedal BP on an uphill slope or the like, so that engine 1 that has been automatically stopped during the stoppage of the vehicle restarts, and the vehicle generates the starting driving force required for starting on the uphill slope by the depression of the accelerator pedal (pedal depression changing operation).

A check valve CV is provided as necessary. The check valve CV transfers the brake fluid pressure generated within the master cylinder MC into the wheel cylinders WC when the solenoid valve SV is closed and the driver increases the brake pedal load. The check valve CV works effectively when the brake fluid pressure generated within the master cylinder MC is greater than that within the wheel cylinder WC. The check valve CV quickly increases brake fluid pressure within the wheel cylinder WC in accordance with the increased brake pedal load.

A relief valve RV is also provided as necessary. The relief valve RV transfers brake fluid within the wheel cylinder WC into the master cylinder MC until the brake fluid pressure within the wheel cylinder becomes a certain pressure level (relief pressure) when the solenoid valve SV is in the shut-off position and the driver gradually or instantly releases the brake pedal BP.

The control unit CU of the brake fluid pressure retaining unit RU detects vehicle speed, depression of the brake pedal BP, driving range of the transmission, etc., and switches the solenoid valve SV from the communicating position to the shut-off position or from the shut-off position to the communicating position. A logic diagram for switching the solenoid valve SV is shown in FIG. 4. In this logic diagram, the solenoid valve SV is switched to the shut-off position when all the following conditions are satisfied: the brake pedal BP is depressed (brake switch BSW [ON]) while the vehicle stops (vehicle speed=0 km/h); and the transmission is set in a driving range (see FIG. 4(a)). Meanwhile, the solenoid valve SV is switched to the communicating position, for example, when the vehicle generates starting driving force. However, according to the brake fluid pressure retaining unit RU, even if the transmission is set in the neutral range, the solenoid valve SV is not switched to the communicating position until the depression of the brake pedal BP is released (brake switch BSW [OFF]) and a predetermined time (first predetermined time) elapses. See FIG. 4(b). As previously described, the first predetermined time is set for 500 msec.

There may be a possibility that dragging of the vehicle may occur if the retention of brake fluid pressure is released at the same time as the depression of the brake pedal is released while the selector of the automatic transmission selects the neutral range. In other words, if an AT vehicle with a fluid-type automatic transmission is also equipped with a prime mover stopping unit which automatically stops engine 1 to improve the fuel economy while the vehicle stops, engine 1 automatically stops when the driver depresses the brake pedal BP and the vehicle stops, and thereafter engine 1 restarts when the driver releases the brake pedal BP.

The fluid-type automatic transmission disengages the clutch when the neutral range is set so that rotation of engine 1 is not transmitted to driving wheels 8, 8. However, because of the oil pressure releasing time characteristics of hydraulic pressure for engaging the clutch and/or the viscosity of the automatic fluid, small clutch torque may remain even in the neutral range.

In this instance, if the vehicle restarts the engine 1 while the vehicle is stopped on a flat road with the engine 1 automatically stopped, rotation of the axle may arise due to the engine torque generated upon restarting the engine 1 and a remaining torque of the automatic transmission, thereby causing dragging of the vehicle.

According to the present invention, even if the automatic transmission is set in the neutral position, braking force of the wheel brakes is retained for a certain period of time (first predetermined time) instead of releasing the braking force instantly.

Brake switch BSW detects whether or not the brake pedal BP has been depressed, and based on this detection value the control unit CU controls the solenoid valve SV. The brake switch BSW turns ON when the brake pedal BP is depressed, and turns OFF when the depression of the brake pedal BP is released.

Basic Operation of Brake Fluid Pressure Retaining Unit

With reference to FIGS. 3 and 4, basic operation of the brake fluid pressure retaining unit RU according to the present invention will be described.

<Switching the Solenoid Valve to Shut-Off Position while the Vehicle Stops>

As shown in FIG. 4(a), the brake fluid pressure retaining unit RU (control unit CU) switches the solenoid valve SV to the shut-off position to shut off the brake fluid passage FP on condition that the brake pedal BP is depressed while the vehicle is stopped and that the transmission is set in a driving range. This is because shutting off the brake fluid passage FP and retaining brake fluid pressure within the wheel cylinder WC will not cause any problems as long as the vehicle has been stopped. Further, because the transmission is set in a driving range, it is considered that the driver has an intention to restart the vehicle, so that brake fluid pressure is retained to ease the starting operation on an up slope hill slope.

<Switching the Solenoid Valve to Communicating Position>

The brake fluid pressure retaining unit RU (control unit CU) releases the retention of brake fluid pressure when the vehicle generates starting driving force. For example, in the case where the selector of the transmission is set to a driving range, starting driving force is generated by the driver changing the depression from the brake pedal BP to the accelerator pedal. Therefore, the solenoid valve SV is switched to the communicating position after the first predetermined time elapses. The first predetermined time is time required for the driver's pedal depression changing operation.

According to this embodiment, even if the selector of the transmission is set in the neutral range, brake fluid pressure is continuously retained for the first predetermined time after the driver releases the depression of the brake pedal BP. See FIG. 4(b). As described above, retaining the brake fluid pressure even after the transmission is set in the neutral range makes it possible to eliminate the drawback in that dragging of the vehicle arises due to a remaining torque of the automatic transmission.

Stopping/Starting on Uphill Slope

For example, when the driver stops the vehicle on an uphill slope and waits for a traffic signal, the driver depresses the brake pedal BP to prevent the vehicle from rolling down the slope due to its own weight. Therefore, brake fluid pressure generated at the master cylinder MC is transmitted with a flow of brake fluid to the wheel cylinder WC through the brake fluid passage FP and the solenoid valve SV that is in the communicating position, to thereby stop the vehicle on the slope.

Control unit CU determines various conditions, such as whether the vehicle is stopped or not, and switches the solenoid valve SV to the shut-off position to retain the brake fluid pressure within the wheel cylinder WC. It is not necessary for the control unit CU to determine whether the vehicle stops on a slope or not. If the brake fluid pressure retaining unit RU is provided with a check valve CV, notwithstanding that the solenoid valve SV is in the shut-off position, the driver can increase braking force through the check valve CV by further depressing the brake pedal BP.

The driver then releases the brake pedal BP and depresses the accelerator pedal (not shown) in order to start the vehicle on an uphill slope. In this operation, because the solenoid valve SV is in the shut-off position, even if the driver releases the depression of the brake pedal BP, the brake fluid pressure is continuously retained within the wheel cylinder WC so that the braking force continuously acts on the vehicle. This can prevent the vehicle from unintentionally rolling down the slope. Meanwhile, depression of the accelerator pedal generates driving force. However, if the solenoid valve SV is continuously kept in the shut-off position, the vehicle cannot start on the uphill slope. For this reason, the control unit CU makes the solenoid valve SV return (switch) to its communicating position when the driver depresses the accelerator pedal and the starting driving force for starting on the uphill slope is generated on the vehicle, so that the braking force is removed to permit starting on the uphill slope.

In the case where the brake fluid pressure retaining unit RU is provided with a restriction D, brake fluid pressure within the wheel cylinder WC gradually decreases through the restriction irrespective of the solenoid valve's shut-off position. Braking force gradually decreases at the same time. Meanwhile, driving force increases by the driver depressing the accelerator pedal. The vehicle starts on the uphill slope when the starting driving force becomes greater than the total amount of the force which resists the advancing movement of the vehicle due to its own weight and the braking force which gradually decreases.

Because of the restriction D, if the vehicle remains still on the slope for about 500 msec without rolling down the slope after the driver releases the depression of the brake pedal BP, the driver can readily start the vehicle on the uphill slope. This is because, normally, sufficient starting driving force generates by the depression of the accelerator pedal, etc. by the time when 500 msec elapses after the driver releasing the depression of the brake pedal BP. The driver may often forcefully depress the brake pedal BP more than required. However, if the brake fluid pressure retaining unit RU is provided with a relief valve RV, gradually or instantly releasing the depression of the brake pedal BP enables the brake fluid pressure within the wheel cylinder WC to be quickly decreased to a predetermined brake fluid pressure (relief pressure), allowing a smooth starting operation of the vehicle on the uphill slope.

The timing at which the solenoid valve SV is switched to the communicating position occurs when a starting driving force generates. If the solenoid valve SV remains in the shut-off position, the vehicle cannot start to move or brake dragging occurs.

Stopping/Starting on Downhill Slope

When the driver stops the vehicle on a downhill slope, the driver depresses the brake pedal BP as with the case of uphill slope. The control unit CU determines conditions, such as whether the vehicle is stopped or not, and switches the solenoid valve SV to the shut-off position, as with the case of the uphill slope, to retain the brake fluid pressure within the wheel cylinder WC. As described above, it is not necessary for the control unit CU to determine whether the vehicle stops on an uphill slope or a downhill slope.

The driver releases the depression of the brake pedal BP for starting off on the downhill slope. The vehicle can start off on a downhill slope due to its own weight by merely releasing the brake pedal BP gradually or instantly without requiring the accelerator pedal operation of the driver. In this instance, if a control is made to switch the solenoid valve SV to the communicating position after a certain period of time elapses from when the driver releases the depression of the brake pedal BP, the vehicle can start off on the downhill slope due to its own weight.

In the case where the brake fluid pressure retaining unit RU is provided with a restriction D, even if the solenoid valve SV is in the shut-off position, braking force gradually decreases by gradually or instantly releasing the depression of the brake pedal BP. Therefore, even if the solenoid valve SV is in the shut-off position, as with the case of the normal starting operation on a downhill slope, the vehicle can start off on a downhill slope due to its own weight without requiring the accelerator pedal operation.

Signals

Signals to be transmitted and received in this system will be described. With reference to FIG. 2, the letter "F_" in front of each signal indicates that the signal is flag information, which is either a 0 or 1. The letter "V_" indicates that the signal is numerical information (unit is optional), and the letter "I_" indicates that the signal includes different kinds of information.

Signals transmitted from FI/MG ECU 4 to AT ECU 6 will be described. V_MOTTRQ represents an output torque value of motor 2. F_MGSTB is a flag showing whether all the conditions except for the three conditions of F_ATOK are satisfied in the engine automatic stop conditions to be described later. If all the conditions are satisfied, a 1 is provided, and if not, 0 is provided. When F_MGSTB and F_ATOK are both set to 1, engine 1 is automatically stopped. When one of these flags is set to 0, engine 1 is automatically actuated.

A signal transmitted from FI/MG ECU 4 to AT ECU 6 and MOT ECU 5 will be described. V_NEP represents engine speed.

Signals transmitted from AT ECU 6 to FI/MG ECU 4 will be described. F_ATOK is a flag indicating whether all of the three following conditions are satisfied: (1) the oil temperature of AT 3 is equal to or greater than a certain value, (2) the temperature of brake fluid is equal to or greater than a certain value, and (3) the brake fluid pressure retaining unit RU is normal (including a condition that the driving circuit for the solenoid valve SV (FIG. 3) of the brake fluid pressure retaining unit RU is normal). If all the conditions are satisfied, a 1 is provided, and if not, 0 is provided. While engine 1 is stopped, the conditions (1) the oil temperature of AT 3 is equal to or greater than a certain value and (2) the temperature of brake fluid is equal to or greater than a certain value are satisfied, and F_ATOK is only determined by (3) whether the brake fluid pressure retaining unit RU is normal. In other words, while engine 1 is stopped, if the brake fluid pressure retaining unit RU is normal, F_ATOK becomes 1, and if the brake fluid pressure retaining unit RU malfunctions, F_ATOK becomes 0. F_ATTO is a flag indicating whether the oil temperature of AT 3 is equal to or greater than a certain value. If the oil temperature of AT 3 is equal to or greater than the certain value, a 1 is provided, and if the oil temperature is less than the value, a 0 is provided. The oil temperature of AT 3 is obtained from an electrical resistance value of the linear solenoid valve controlling the hydraulic pressure of the starting clutch at AT 3. F_POSR is a flag indicating whether the positioning switch PSW is set in the R range. If the positioning switch PSW is set in the R range, a 1 is provided, and if not, a 0 is provided. F_POSDD is a flag indicating whether the positioning switch PSW is set in the D range and the mode switch MSW is set in the D mode. If the D range and D mode (D range/D mode) are selected, a 1 is provided, and if not, a 0 is provided. When FI/MG ECU 4 does not receive any information indicating the D range/D mode, R range, P range or N range, FI/MG ECU 4 determines that either the D range/S mode or L range is selected.

Signals transmitted from engine 1 to FI/MG ECU 4 and AT ECU 6 will be described. V_ANP represents a negative pressure value at the intake pipe of engine 1. V_TH represents a throttle angle. V_TW represents a temperature of the cooling water at engine 1. V_TA represents the intake temperature of engine 1. The brake fluid temperature in the brake fluid pressure retaining unit RU disposed within the engine compartment is obtained from the intake temperature. This is because both temperatures change with respect to the temperature at the engine compartment.

A signal transmitted from AT 3 to FI/MG ECU 4 and AT ECU 6 will be described. V_VSP1 represents a vehicle speed pulse from one of two vehicle speed pickups provided in AT 3. Vehicle speed is calculated based on this vehicle speed pulse.

Signals transmitted from AT 3 to AT ECU 6 will be described. V_NDRP represents a pulse showing the number of revolutions at the input side of AT 3. V_NDNP represents a pulse showing the number of revolutions at the output side of AT 3. V_VSP2 represents a vehicle speed pulse from the other vehicle speed pickup at AT 3. V_VSP2 is more accurate than V_VSP1, and V_VSP2 is used for calculating the amount of clutch slipping at AT 3.

Signals transmitted from MOT ECU 5 to FI/MG ECU 4 will be described. V_QBAT represents the remaining capacity of the battery. V_ACTTRQ represents an output torque value of motor 2, which is the same as V_MOTTRQ. I_MOT represents information such as the amount of generated energy of motor 2 showing electric loading. Motor 2 generates all the electric power consumed for the vehicle, including the electric power for driving the motor.

Signals transmitted from FI/MG ECU 4 to MOT ECU 5 will be described. V_CMDPWR represents an output required value to motor 2. V_ENGTRQ represents an output torque value of engine 1. I_MG represents information such as an actuation mode, assist mode and a regeneration mode with respect to motor 2.

A signal transmitted from the master power unit MP to FI/MG ECU 4 will be described. V_M/PNP represents a negative pressure detected value at a constant pressure chamber of the master power MP.

A signal transmitted from the positioning switch PSW to FI/MG ECU 4 will be described. An N or P is transmitted as positioning information when the positioning switch PSW is set to either the N or P range.

A signal transmitted from AT ECU 6 to AT 3 will be described. V_SCHP represents a hydraulic pressure command value transmitted to the linear solenoid valve, which controls the hydraulic pressure for engaging/disengaging the starting clutch at AT 3.

Signals transmitted from AT ECU 6 to the brake fluid pressure retaining unit RU will be described. F_SOLA is a flag for the ON/OFF of one solenoid valve SVA (FIG. 3(*a*)) provided in the brake fluid pressure retaining unit RU. A 1 is provided for turning ON the solenoid valve SVA, and a 0 is provided for turning OFF the solenoid valve SVA. Likewise, F_SOLB is a flag for the ON/OFF of the other solenoid valve SVB (FIG. 3(*a*)). A 1 is provided for turning ON the solenoid valve SVB, and a 0 is provided for turning OFF the solenoid valve SVB.

A signal transmitted from the positioning switch PSW to AT ECU 6 will be described. The positioning switch PSW is set to the N, P, R, D or L range, and the selected range is transmitted as positioning information.

A signal transmitted from the mode switch MSW to AT ECU 6 will be described. The mode switch MSW is set to either the D (normal running mode) or S mode (sports running mode), and the selected mode is transmitted as mode information. The mode switch MSW is a mode selection switch which works when the positioning switch PSW is set in the D range.

A signal transmitted from the brake switch BSW to FI/MG ECU 4 and AT ECU 6 will be described. F_BKSW is a flag showing whether the brake pedal BP is depressed (ON) or released (OFF). If the brake pedal BP is depressed, a 1 is provided, and if the brake pedal is released, a 0 is provided. As described previously, this signal may be a flag showing whether the driver places his foot on the brake pedal BP (ON) or releases his foot from the brake pedal BP (OFF).

Conditions for Automatically Stopping the Engine

For the purpose of further improving fuel consumption, the prime mover stopping unit automatically stops engine 1 while the vehicle stops. Conditions for automatically stopping engine 1 will be described. When all the following conditions (shown in FIG. 5(*a*)) are satisfied, an engine stop order (F_ENGOFF) is transmitted and engine 1 is automatically stopped.

Positioning switch PSW is set to D range and Mode switch MSW is set to D mode (hereinafter referred to as D range/D mode).

In a range other than the D range/D mode, engine 1 does not stop unless the driver turns off the ignition switch. This is because if an automatic engine stop order is transmitted and engine 1 stops, for example, during the time when the positioning switch PSW is set to P range or N range, the driver may consider that he has already turned off the ignition switch or it is not necessary to turn off the ignition switch, and he may walk away from the vehicle. When the position switch PSW is set to D range and the mode switch MSW is set to S mode (hereinafter referred to as D range/S mode), the automatic engine stop operation is not carried out. This is because at the D range/S mode the driver is expecting the vehicle to perform a quick start operation. The automatic engine stop operation is not carried out when the positioning switch PSW is set to the L range or R range. This is a condition for the following reasons. A steering operation at a garage while selecting the L or R range will be time-consuming if engine 1 is stopped whenever the vehicle stops for changing steering directions.

2) Brake pedal BP is depressed and Brake switch BSW is ON.

This is a condition for warning the driver. The driver places his foot on the brake pedal BP when the brake switch BSW is ON. Therefore, if engine 1 is automatically stopped and the driving force is lost, the driver can easily increase a brake pedal load before the vehicle unintentionally displaces backwards on a slope.

3) Vehicle speed reaches 5 km/h once after engine actuation.

This is a condition for facilitating a steering operation at a garage while the vehicle moves in creep running. The steering operation at a garage will be time-consuming if engine 1 is stopped whenever the vehicle stops for changing steering directions.

4) Vehicle speed is 0 km/h.

This is a condition because the driving force is not required when the vehicle stops.

5) Capacity of the battery is not less than a certain value.

This is a condition because if the remaining capacity of the battery is not enough to restart engine 1, the motor cannot actuate engine 1 after stopping the engine 1.

6) Electric load is not more than a certain value.

This is a condition for securing sufficient electrical supply to loads. Engine 1 may be automatically stopped if the electric load is not more than a certain value.

7) Load of the constant pressure chamber of the master power unit MP is not less than a certain value.

Because negative pressure in the constant pressure chamber is obtained from the intake pipe of engine 1, negative pressure in the constant pressure chamber becomes far smaller if engine 1 is stopped at smaller negative pressures. This leads to reduced amplification of the brake load when the driver depresses the brake pedal BP, and hence results in deteriorated braking performance.

8) Accelerator pedal is not depressed.

This is a condition because the driver does not intend further increase of the driving force, engine 1 may be automatically stopped.

9) Water temperature of the engine 1 is not less than a certain value.

This is a condition because the stop/actuation operation of engine 1 should be carried out when engine 1 is in stable conditions. In a cold area, if the water temperature is low, engine 1 may not restart.

10) Oil temperature of the AT 3 is not less than a certain value.

This is a condition because if the oil temperature of the AT 3 is low, the start-up for hydraulic pressure of the starting clutch will cause a delay. Therefore, the required time from the engine actuation to the generation of creep force is extended, and the vehicle will displace backwards on a slope.

11) Temperature of the brake fluid is not less than a certain value.

This is a condition because if the temperature of the brake fluid is low, a flow resistance at the restriction D becomes greater, and hence results in unnecessary brake dragging. For this reason, the brake fluid pressure retaining unit RU does not work. Therefore, the automatic engine stop operation is prohibited so that the creep force prevents the vehicle from unintentionally rolling down a slope. For example, if the brake fluid pressure retaining unit RU does not include a restriction D in the brake fluid pressure circuit BC, a servo valve LSV, which is capable of changing the valve opening degree, maybe provided in place of the restriction D. In this instance, the temperature control for the brake fluid is not so important.

12) Brake fluid pressure retaining unit RU is normal.

This is a condition because the brake fluid pressure may not be retained if the brake fluid pressure retaining unit RU is out of order, therefore, the creep force prevents the vehicle from unintentionally rolling down a slope. For this reason, the automatic engine stop operation is not carried out if the brake fluid pressure retaining unit RU is out of order. However, the automatic engine stop operation may be carried out if the brake fluid pressure retaining unit RU is normal.

Conditions for Automatically Actuating the Engine

After automatically stopping engine 1, engine 1 is automatically restarted in the following conditions (FIG. 5(*b*)). Each of the conditions will be described below. When any of the following conditions is satisfied, engine 1 is automatically restarted.

As shown in Timing charts (1) through (3) to be described later, engine 1 may be restarted after a certain period of time (third predetermined time) elapses.

D range/D mode or N range is selected, and Depression of the brake pedal BP is released.

This is a condition because the determination of the starting operation is carried out when the driver releases the brake pedal BP. When the driver releases the brake pedal BP in the D range/D mode, it is assumed that the driver initiates the starting operation. Therefore, engine 1 is automatically actuated. Meanwhile, when the driver releases the brake pedal BP in the N range, engine 1 is automatically actuated. If the engine 1 is not automatically actuated when the transmission is set in the N range, the driver may consider that he has already turned off the ignition switch or it is not necessary to turn off the ignition switch. Therefore, engine 1 is automatically actuated as fail-safe measure in order to remind the driver not to exit the vehicle without turning off the ignition switch.

D range/S mode is selected.

After engine 1 is automatically stopped in the D range/D mode, if the driver switches to the D range/S mode, engine 1 is then automatically actuated. This is a condition because the driver is expecting a quick start operation in the D range/S mode, engine 1 is automatically actuated without waiting for the driver releasing the brake pedal BP.

Accelerator pedal is depressed.

This is a condition because the driver is expecting driving force from engine 1.

P range, L range or R range is selected.

After engine 1 is automatically stopped in the D range/D mode, if the driver switches, for example, to the P range, engine 1 is then automatically actuated. If the engine 1 is not automatically actuated when the transmission is set in the P range, the driver may consider that he has already turned off the ignition switch or it is not necessary to turn off the ignition switch. Therefore, engine 1 is automatically actuated as fail-safe measure in order to remind the driver not to exit the vehicle without turning off the ignition switch. Meanwhile, engine 1 is automatically actuated when the driver switches to the L range or R range. This is a condition because the driver intends to start the vehicle.

Remaining capacity of the battery is not more than a certain value.

This is a condition because engine 1 is not automatically actuated if the remaining capacity of the battery is too low. Engine 1 is not stopped unless the remaining capacity of the battery is more than a certain value. However, the capacity of the battery may lower after engine 1 is automatically stopped. In this case, engine 1 is automatically actuated for the purpose of charging the battery. The certain value is set to be higher than the critical battery capacity, below which engine 1 is not actuated.

Electric load is not less than a certain value.

While components that consume electricity, such as lights, are on, the capacity of the battery decreases quickly. As a result, engine 1 will not be restarted. For this reason, irrespective of the remaining capacity of the battery, engine 1 is automatically actuated when the electric load is not less than a certain value.

Negative pressure of the master power MP is not more than a certain value.

This is a condition because the lower the negative pressure at the master power MP, the lower the obtained braking force. Therefore, engine 1 is restarted to secure sufficient braking force.

Brake fluid pressure retaining unit RU is out of order.

If the solenoid valve SV or the driving circuit for the solenoid valve SV is out of order, the engine 1 is automatically actuated. If a failure is detected in the brake fluid pressure retaining unit RU including the driving circuit for the solenoid valve SV after stopping engine 1, engine 1 is immediately actuated such that the creep force generates. This is because the brake fluid pressure may not be retained after releasing the brake pedal BP upon starting the vehicle. In other words, it is the creep force that prevents the vehicle from undesirable backward displacement and facilitates a smooth starting operation of the vehicle on an uphill slope.

With reference to Timing charts shown in FIGS. 6 through 9, description will be given to the timing of retaining/releasing the brake fluid pressure by the brake fluid pressure retaining unit RU and the timing of restarting the engine by the prime mover stopping unit.

In any of the timing charts, the vehicle that has been running in the D range/D mode stops after the driver depresses the brake pedal BP, and the prime mover stopping unit automatically stops engine 1. In these timing charts, release of the brake fluid pressure through the relief valve RV is not considered.

Timing Chart (1)

Figure 6:
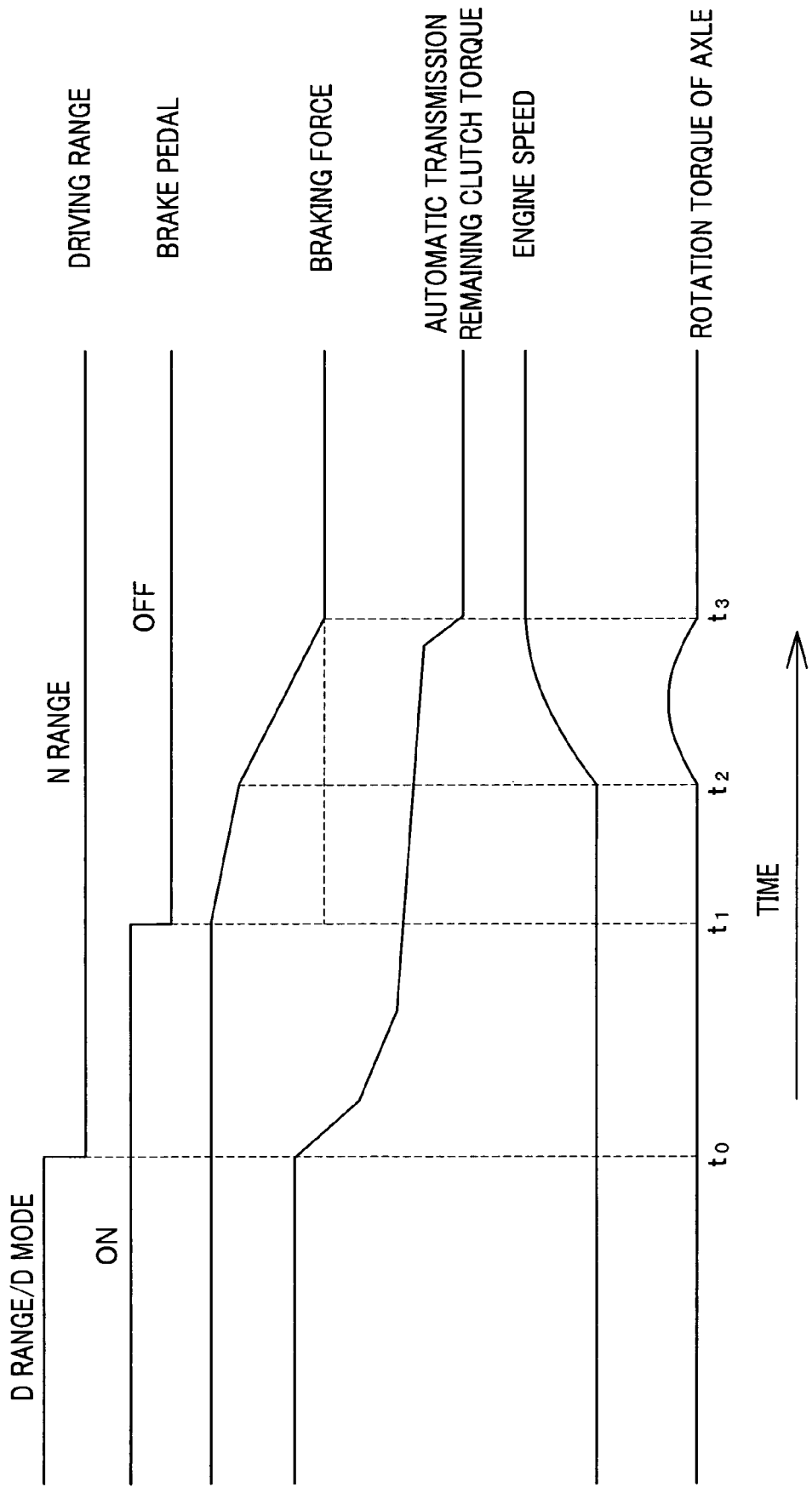
FIG. 6 is a timing chart (1) for a first configuration of a vehicle equipped with a vehicle control apparatus according to the present invention, wherein timing of retaining/releasing brake fluid pressure by the brake fluid pressure retaining unit and timing of restarting the engine by the prime mover stopping unit are shown.

As shown in FIG. 6, when the driver sets the automatic transmission in the neutral range while depressing the brake pedal BP, the clutch of the automatic transmission is disengaged. However, a remaining clutch torque may remain due to the oil pressure releasing time characteristics for the hydraulic oil engaging the clutch and/or the viscosity of the automatic fluid. This remaining clutch torque gradually decreases with elapse of time.

Next, the driver releases the brake pedal BP at time $t_1$.

Even if the depression of the brake pedal BP is released while the transmission is set in the neutral range, the solenoid valve SV of the brake fluid pressure retaining unit RU is kept in the shut-off position until time $t_3$ so that brake fluid pressure is retained. The period of time (first predetermined time) from time $t_1$ to time $t_3$ is set, for example, for 400-600 msec, and preferably 500 msec.

While the solenoid valve SV of the brake fluid pressure retaining unit RU retains brake fluid pressure, the brake fluid pressure is gradually released through the restriction D.

A flow control valve is provided at the restriction D so that brake fluid pressure decreases at a relatively small decreasing rate from time $t_1$ to time $t_2$ and at a relatively large decreasing rate from time $t_2$ to time $t_3$. For example, the period of time from time $t_1$ to time $t_2$ is set for 200 msec, and the period of time from time $t_2$ to time $t_3$ is set for 300 msec.

The decreasing rate of braking force between time $t_1$ and time $t_2$ is smaller than the decreasing rate of braking force between time $t_2$ and time $t_3$. This is for retaining sufficient braking force, as described later, until the prime mover stopping unit restarts the engine after 200 msec elapses from when the driver releases the depression of the brake pedal BP, so that even if a torque generates due to restart of the engine, the retained braking force prevents the dragging of the vehicle.

After the driver releases the brake pedal BP at time $t_1$, the prime mover stopping unit restarts the engine at time $t_2$ that is when 200 msec (third predetermined time) elapses from time $t_1$. Rotation of the engine stabilizes in the period of time from time $t_2$ to time $t_3$, and actuation of the engine is completed with the idling torque being stable.

The prime mover stopping unit restarts the engine after 0-300 msec, and preferably 200 msec elapses from when the driver releases the brake pedal BP.

In the period of time from time $t_2$ to time $t_3$, a torque generated at the restart of the engine and a remaining clutch torque of the automatic transmission may cause a rotation torque of the axle. However, the brake fluid pressure retaining unit RU retains sufficient brake fluid pressure in this period of time, thereby preventing the dragging of the vehicle.

Timing Chart (2)

Figure 7:
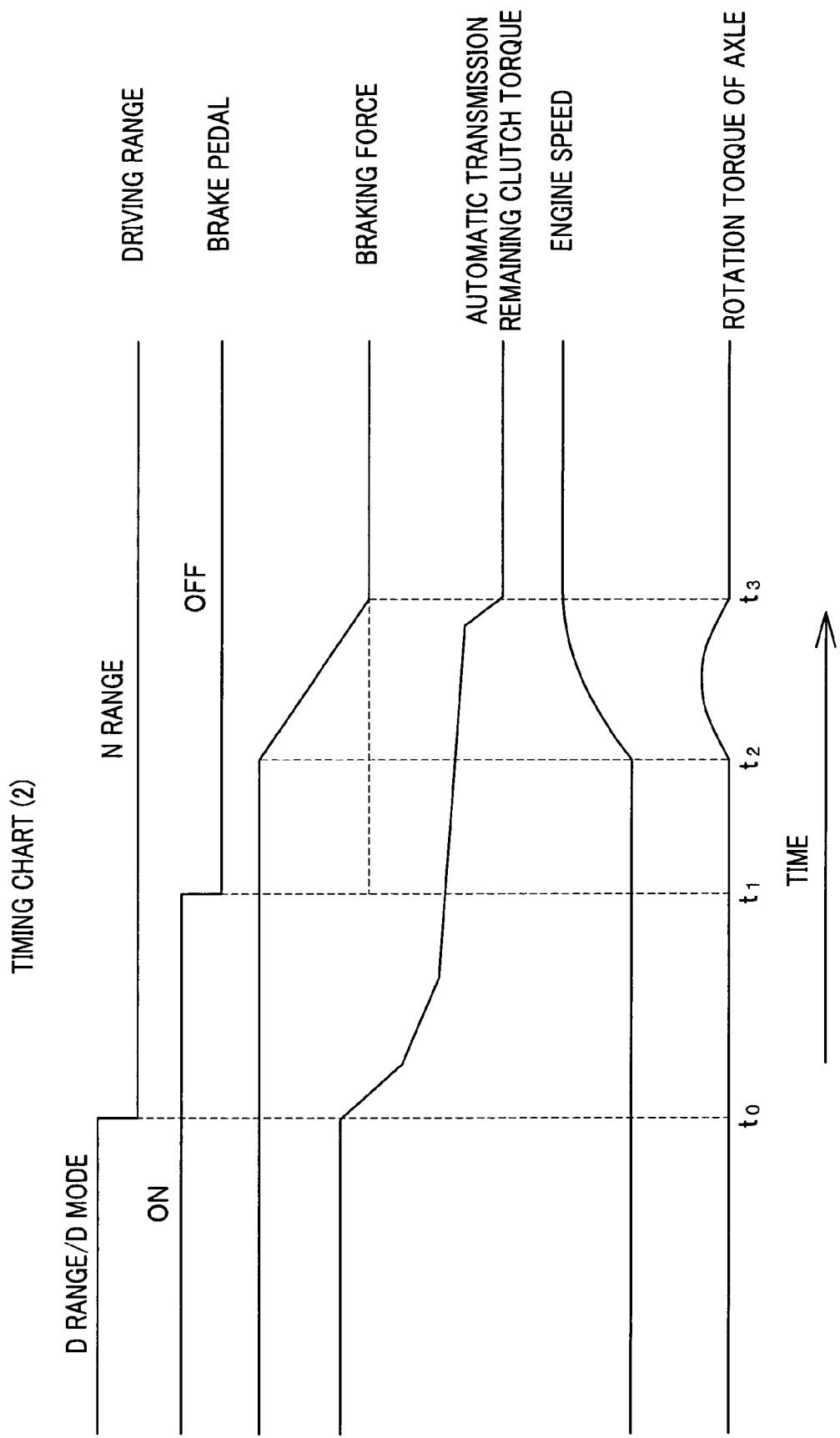
FIG. 7 is a timing chart (2) for a second configuration of a vehicle equipped with a vehicle control apparatus according to the present invention, wherein timing of retaining/releasing brake fluid pressure by the brake fluid pressure retaining unit and timing of restarting the engine by the prime mover stopping unit are shown.

As shown in FIG. 7, control in Timing chart (2) is substantially the same as Timing chart (1). However, the flow control valve provided at the restriction D retains brake fluid pressure for the period of time (second predetermined time) from time $t_1$ to time $t_2$, and gradually releases the brake fluid pressure for the period of time from time $t_2$ to time $t_3$. The retained brake fluid pressure becomes zero at time $t_3$.

For example, the second predetermined time is set for 0-300 msec, and preferably 200 msec, from when the driver releases the brake pedal BP. Further, the second predetermined time may be set so that the brake fluid pressure is released at the timing after the prime mover stopping unit restarts the engine 1 after the driver releases the brake pedal BP.

In the period of time from time $t_2$ to $t_3$, a torque generated at the restart of the engine and a remaining clutch torque of the automatic transmission may cause a rotation torque of the axle. However, the brake fluid pressure retaining unit RU retains sufficient brake fluid pressure in this period of time, thereby preventing the dragging of the vehicle.

Timing Chart (3)

As shown in FIG. 8, when the driver sets the automatic transmission in the neutral range while depressing the brake pedal BP, the clutch of the automatic transmission is disengaged. The driver then releases the brake pedal BP at time $t_1$.

Even if the depression of the brake pedal BP is released while the transmission is set in the neutral range, the solenoid valve SV of the brake fluid pressure retaining unit RU is kept in the shut-off position until time $t_4$ so that brake fluid pressure is retained. The period of time (first predetermined time) from time $t_1$ to time $t_4$ is set for 600 msec.

While the solenoid valve SV of the brake fluid pressure retaining unit RU retains brake fluid pressure, the brake fluid pressure is gradually released through the restriction D.

A flow control valve is provided at the restriction D so that brake fluid pressure is gradually released at a constant decreasing rate from time $t_1$ to time $t_4$. When the solenoid valve SV is switched from the shut-off position to the communicating position at time $t_4$, the brake fluid pressure remaining on the wheel cylinder WC side is released all at once.

Meanwhile, after the driver releases the brake pedal BP at time $t_1$, the prime mover stopping unit restarts the engine at time $t_2$ that is 200 msec (third predetermined time) elapses from time $t_1$. Rotation of the engine stables in the period of time from time $t_2$ to time $t_3$, and actuation of the engine is completed with the idling torque being stable. Because the remaining clutch torque of the automatic transmission becomes zero at time $t_3$, no rotation torque of the axle is generated after time $t_3$.

The brake fluid pressure retaining time (first predetermined time) by the brake fluid pressure retaining unit RU is set for 600 msec in consideration of safety for time differences until remaining clutch torque of the automatic transmission is lost and the fact that unlike a starting operation on an uphill slope, a brake dragging will hardly occur in the neutral range.

In the period of time from time $t_2$ to time $t_3$, a torque generated at the restart of the engine and a remaining clutch torque of the automatic transmission may cause a rotation torque of the axle. However, the brake fluid pressure retaining unit RU retains sufficient brake fluid pressure in this period of time, thereby preventing the dragging of the vehicle.

Timing Chart (4)

As shown in FIG. 9, when the driver sets the automatic transmission in the neutral range while depressing the brake pedal BP, the clutch of the automatic transmission is disengaged. The driver then releases the brake pedal BP at time $t_1$.

Even if the depression of the brake pedal BP is released while the transmission is set in the neutral range, the solenoid valve SV of the brake fluid pressure retaining unit RU is kept in the shut-off position until time $t_3$ so that brake fluid pressure is retained. The period of time (first predetermined time) from time $t_1$ to time $t_3$ is set for 600 msec.

While the solenoid valve SV of the brake fluid pressure retaining unit RU retains brake fluid pressure, the brake fluid pressure is gradually released through the restriction D.

A flow control valve is provided at the restriction D so that brake fluid pressure is gradually released at a constant decreasing rate from time $t_1$ and the retained brake fluid pressure becomes zero at time $t_3$.

Meanwhile, when the driver releases the brake pedal BP at time $t_1$, the prime mover stopping unit restarts the engine. Because the remaining clutch torque of the automatic transmission becomes zero at time $t_2$, no rotation torque of the axle is generated after time $t_2$.

As with the above Timing chart (3), the brake fluid pressure retaining time (first predetermined time) by the brake fluid pressure retaining unit RU is set for 600 msec in consideration of safety for time differences until remaining clutch torque of the automatic transmission is lost and the fact that unlike a starting operation on an uphill slope, a brake dragging will hardly occur in the neutral range.

In the period of time from time $t_1$ to time $t_2$, a torque generated at the restart of the engine and a remaining clutch torque of the automatic transmission may cause a rotation torque of the axle. However, the brake fluid pressure retaining unit RU retains sufficient brake fluid pressure in this period of time, thereby preventing the dragging of the vehicle.

While the present invention has been described in detail with reference to specific embodiments thereof, it will be apparent to one skilled in the art that various changes and modifications may be made without departing from the scope of the claims.

For example, the brake fluid pressure retaining unit RU may be controlled to retain brake fluid pressure (braking force) until at least a predetermined time (fourth predetermined time) elapses from when the driver sets the automatic transmission in the neutral range while depressing the brake pedal BP with the vehicle stopped.

The fourth predetermined time is preferably set as time until the remaining clutch torque of the automatic transmission is lost while the transmission is set in the neutral range. To be more specific, the brake fluid pressure retaining unit RU is preferably controlled to retain brake fluid pressure during the period of time from time $t_0$ to time $t_3$ in the cases of Time charts shown in FIGS. 6, 7 and 9, and to retain brake fluid pressure during the period of time from time $t_0$ to time $t_4$ in the case of Time chart shown in FIG. 8. In this embodiment, the fourth predetermined time is set in the rage between 0.5 (500 msec) to 1 second, and preferably 0.7 seconds (700 msec).

As described above, on the basis of the time point when the driver shifts the selector of the automatic transmission to the neutral range, the retained brake fluid pressure is released after the fourth predetermined time elapses. Therefore, no remaining torque exists at the automatic transmission even if a torque is generated upon the driving motor stopping unit restarting the engine, thereby preventing the dragging of the vehicle.

Further, there is no need to control the valve opening timing of the flow control valve provided at the restriction D while the transmission is set in the neutral range, and the solenoid valve SV may be switched to the communicating position after the first predetermined time elapses.

What is claimed is:

1. A vehicle control apparatus for controlling a prime mover and wheel brakes which are equipped in a vehicle with an automatic transmission having a clutch, the vehicle control apparatus comprising:

a prime mover stopping unit which stops and restarts the prime mover under predetermined conditions; said prime mover stopping unit being operable to automatically stop operation of the prime mover when the vehicle is fully stopped due to application of the wheel brakes; and a braking force retaining unit which retains braking force of each of the wheel brakes, wherein when the automatic transmission is set in a neutral range, the braking force retaining unit retains the braking force of the wheel brakes for a first predetermined time after an operation of a brake operation member is disengaged; and wherein said braking force retaining unit retains braking force to counteract any remaining torque of said clutch of the automatic transmission, so as to minimize dragging of the vehicle.

2. A vehicle control apparatus according to claim 1, wherein the braking force retaining unit retains the braking force such that the braking force gradually decreases immediately after the operation of the brake operation member is disengaged.

3. A vehicle control apparatus according to claim 1, wherein the first predetermined time at least includes a period of time from when the operation of the brake operation member is disengaged to when the remaining torque of said clutch of the automatic transmission becomes zero.

4. A vehicle control apparatus according to claim 1, wherein the braking force retaining unit releases the braking force after a second predetermined time elapses from when the operation of the brake operation member is disengaged.

5. A vehicle control apparatus according to claim 4, wherein the braking force retaining unit retains the braking force such that the braking force gradually decreases.

6. A vehicle control apparatus according to claim 4, wherein the second predetermined time is a period of time from when the operation of the brake operation member is disengaged to when the prime mover stopping unit restarts the prime mover.

7. A vehicle control apparatus according to claim 1, wherein the prime mover stopping unit stops the prime mover when the vehicle that has been running stops in accordance with the operation of the brake operation member, and restarts the prime mover when the operation of the brake operation member is disengaged.

8. A vehicle control apparatus according to claim 7, wherein the prime mover stopping unit restarts the prime mover after a third predetermined time elapses from when the operation of the brake operation member is disengaged.

9. A vehicle control apparatus according to claim 8, wherein the third predetermined time is shorter than the first predetermined time.

10. A vehicle control apparatus according to claim 7, wherein the braking force retaining unit retains the braking force such that the braking force gradually decreases after the operation of the brake operation member is disengaged.

11. A vehicle control apparatus according to claim 8, wherein the braking force retaining unit retains the braking force such that the braking force gradually decreases after the operation of the brake operation member is disengaged.

12. A vehicle control apparatus according to claim 7, wherein the braking force retaining unit releases the braking force after a second predetermined time elapses from when the operation of the brake operation member is disengaged.

13. A vehicle control apparatus according to claim 8, wherein the braking force retaining unit releases the braking force after a second predetermined time elapses from when the operation of the brake operation member is disengaged.

14. A vehicle control apparatus according to claim 13, wherein the second predetermined time is a period of time from when the operation of the brake operation member is disengaged to when the prime mover stopping unit restarts the prime mover, and the third predetermined time is shorter than the first predetermined time.

15. A vehicle control apparatus according to claim 1, wherein the braking force retaining unit releases the braking force after a fourth predetermined time elapses from when a selector of the automatic transmission is shifted from a driving range to a neutral range.

16. A vehicle control apparatus according to claim 15, wherein the fourth predetermined time is in the range between 0.5 to 1 second.

17. A vehicle control apparatus for controlling a vehicle having an engine, wheel brakes, a brake operation member operatively connected with said wheel brakes, and an automatic transmission for operatively transmitting power from said engine to vehicle wheels, said automatic transmission having a clutch;

said vehicle control apparatus comprising:
a prime mover stopping unit which stops and restarts the engine; said prime mover stopping unit being operable to automatically stop operation of the engine when the vehicle is fully stopped due to operation of the brake operation member; and
a braking force retaining unit which retains braking force of each of the wheel brakes;
wherein:
during a restart operation of the engine, when the automatic transmission is set in a neutral range, the braking force retaining unit retains the braking force of the wheel brakes for a first predetermined time after the operation of the brake operation member is disengaged, in order to counteract a torque generated during said restart operation of the engine and to counteract any remaining torque of said clutch of the automatic transmission so as to minimize dragging of the vehicle; and
wherein said first predetermined time includes a period of time from when the operation of the brake operation member is disengaged to when said remaining torque of the clutch of the automatic transmission becomes zero.

18. A vehicle control apparatus according to claim 17, wherein the braking force retaining unit retains the braking force such that the braking force gradually decreases after the operation of the brake operation member is disengaged.

19. A vehicle control apparatus according to claim 17, wherein the braking force retaining unit releases the braking force after a second predetermined time elapses from when the operation of the brake operation member is disengaged.

20. A vehicle control apparatus according to claim 19, wherein the braking force retaining unit gradually decreases the braking force.

* * * * *